United States Patent
Tamir et al.

(10) Patent No.: US 7,925,795 B2
(45) Date of Patent: Apr. 12, 2011

(54) METHOD AND SYSTEM FOR CONFIGURING A PLURALITY OF NETWORK INTERFACES THAT SHARE A PHYSICAL INTERFACE

(75) Inventors: Eliezer Tamir, Beit Shemesh (IL); Uri Tal, Netanya (IL); Shay Mizrachi, Hod HaSharon (IL)

(73) Assignee: Broadcom Corporation, Irvine, CA (US)

( * ) Notice: Subject to any disclaimer, the term of this patent is extended or adjusted under 35 U.S.C. 154(b) by 191 days.

(21) Appl. No.: 12/111,485

(22) Filed: Apr. 29, 2008

(65) Prior Publication Data
US 2008/0270599 A1 Oct. 30, 2008

Related U.S. Application Data

(60) Provisional application No. 60/914,979, filed on Apr. 30, 2007.

(51) Int. Cl.
*G06F 15/16* (2006.01)
(52) U.S. Cl. ........ 709/250; 709/201; 709/248; 709/249; 370/200; 370/217
(58) Field of Classification Search .......... 709/200, 709/201, 223, 224, 248, 249, 250; 370/200, 370/217
See application file for complete search history.

(56) References Cited

U.S. PATENT DOCUMENTS

| | | | |
|---|---|---|---|
| 6,757,725 B1 * | 6/2004 | Frantz et al. | 709/223 |
| 7,835,380 B1 * | 11/2010 | Aloni et al. | 370/419 |
| 2002/0194415 A1 * | 12/2002 | Lindsay et al. | 710/305 |
| 2009/0077572 A1 * | 3/2009 | Andjelic | 719/321 |

* cited by examiner

*Primary Examiner* — Frantz B Jean
(74) *Attorney, Agent, or Firm* — McAndrews, Held & Malloy, Ltd.

(57) ABSTRACT

Certain aspects of a method and system for configuring a plurality of network interfaces that share a physical interface (PHY) may include a system comprising one or more physical network interface controllers (NICs) and two or more virtual NICs. One or more drivers associated with each of the virtual NICs that share one or more Ethernet ports associated with the physical NICs may be synchronized based on controlling one or more parameters associated with one or more Ethernet ports. One or more wake on LAN (WoL) patterns associated with each of the drivers may be detected at one or more Ethernet ports. A wake up signal may be communicated to one or more drivers associated with the detected WoL patterns. One of the drivers may be appointed to be a port master driver. If a failure of the appointed port master driver is detected, another driver may be appointed to be the port master driver.

30 Claims, 9 Drawing Sheets

METHOD AND SYSTEM FOR CONFIGURING A PLURALITY OF NETWORK INTERFACES THAT SHARE A PHYSICAL INTERFACE

CROSS-REFERENCE TO RELATED APPLICATIONS/INCORPORATION BY REFERENCE

This application makes reference to, claims priority to, and claims benefit of U.S. Provisional Application Ser. No. 60/914,979, filed Apr. 30, 2007.

This application also makes reference to U.S. patent application Ser. No. 11/416,817, filed on May 3, 2006.

Each of the above stated applications is hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to network interface controllers (NICs). More specifically, certain embodiments of the invention relate to a method and system for configuring a plurality of network interfaces that share a physical interface (PHY).

BACKGROUND OF THE INVENTION

The emergence of converged network interface controllers (CNICs) have provided accelerated client/ server, clustering, and storage networking, and have enabled the use of unified TCP/IP Ethernet communications. The breadth and importance of server applications that may benefit from NIC capabilities, together with the emergence of server operating systems interfaces enabling highly integrated network acceleration capabilities, may make NICs a standard feature of, for example, volume server configurations.

The deployment of NICs may provide improved application performance, scalability and server cost of ownership. The unified Ethernet network architecture enabled by NIC may be non-disruptive to existing networking and server infrastructure, and may provide significantly better performance at reduced cost alternatives. A server I/O bottleneck may significantly impact data center application performance and scalability. The network bandwidth and traffic loads for client/server, clustering and storage traffic have outpaced and may continue to consistently outpace CPU performance increases and may result in a growing mismatch of capabilities.

Converged network interface devices are generally utilized to integrate a plurality of different types of network traffic into one physical network. Converged network interface devices may perform protocol acceleration and protocol processing beyond OSI layer 2 and may require considerable computational power. Certain types of traffic such as clustering traffic may require low latency. Storage traffic, for example, may require guaranteed delivery while using the shortest packets infrequently, with normal traffic patterns. Some type of traffic such as critical networking traffic may require varying levels of prioritization, while other networking traffic may require best effort.

The physical interface (PHY) layer corresponds to the physical layer within the Open System Interface (OSI) model, which may enable transmitting raw bits via communication links. The PHY layer, for example, Ethernet network may provide the hardware for sending and receiving data on a carrier, for example, cables. The medium access control (MAC) layer corresponds to the medium access control sub-layer of the Data Link layer within the OSI model. The MAC layer may enable controlling access to shared media networks, and may comprise addressing and/or channel control operations.

A common solution to this challenge has been to use different networking technologies optimized for specific server traffic types, for example, Ethernet for client/ server communications and file-based storage, Fibre Channel for block-based storage, and special purpose low latency protocols for server clustering. However, such an approach may have various operating and/or operational cost issues, which may be disruptive to existing applications, and may inhibit migration to newer server system topologies, such as blade server systems.

A focus of emerging CNIC products may be to integrate the hardware and software components of IP protocol suite offload. The CNICs may allow data center administrators to maximize the value of available server resources by allowing servers to share GbE network ports for different types of traffic, by removing network overhead, by simplifying existing cabling and by facilitating infusion of server and network technology upgrades. The CNICs may allow full overhead of network I/O processing to be removed from the server compared to existing GbE NICs. The aggregation of networking, storage, and clustering I/O offload into the CNIC function may remove network overhead and may significantly increase effective network I/O.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for configuring a plurality of network interfaces that share a physical interface (PHY), substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for configuring a plurality of network interfaces that share a physical interface (PHY). Exemplary aspects of the invention may comprise one or more physical network interface controllers (NICs) and two or more virtual NICs. One or more drivers associated with each of the virtual NICs that share one or more Ethernet ports associated with the physical NICs may be synchronized based on controlling one or more parameters associated with one or more Ethernet ports. One or more wake on LAN (WoL) patterns associated with each of the drivers may be detected at one or more Ethernet ports. A wake up signal may be communicated to one or more drivers associated with the detected WoL patterns. One of the drivers may be appointed to be a port master driver. If a failure of the appointed port master driver is detected, another driver may be appointed to be the port master driver.

Figure 1A:
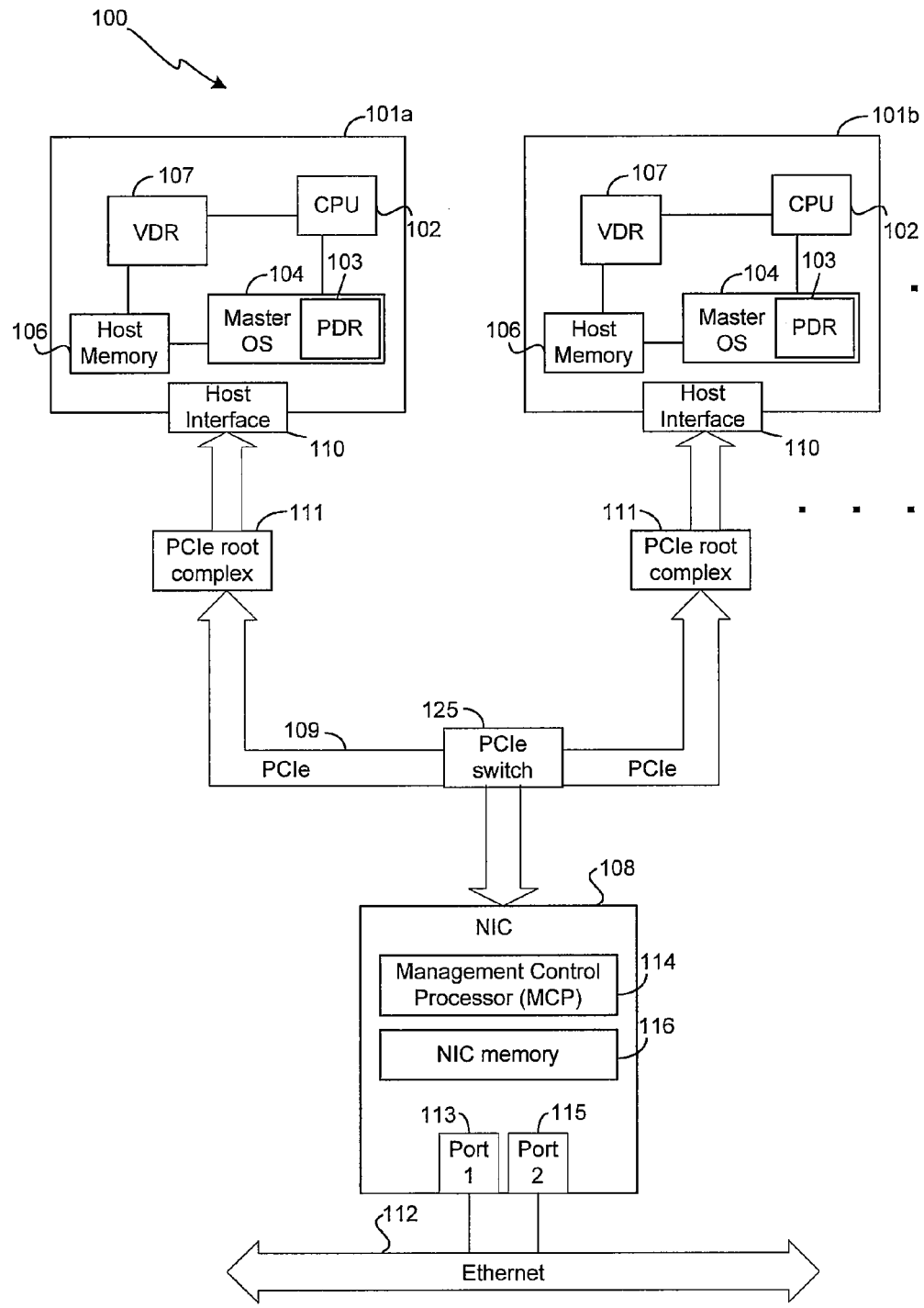
FIG. 1A is a block diagram of an exemplary network communication system, in accordance with an embodiment of the invention.

FIG. 1A is a block diagram of an exemplary network communication system 100, in accordance with an embodiment of the invention. Referring to FIG. 1A, there is shown two or more host computers 101a, 101b, . . . , that are connected to a physical interface, for example, Ethernet network 112 via a physical network interface controller (NIC) 108. The Ethernet network 112 may be assumed to be a 10 Gbps Ethernet network, for example, through which various host computers may communicate with other host computers and access other computing resources. Notwithstanding, the invention may not be so limited and other network packet types and network speeds may be utilized without limiting the scope of the invention. For simplicity in the description that follows, a single one of the host computers 101a, 101b, . . . , may be referred to as a host computer 101.

The host computer 101a, 101b, . . . , may comprise servers, such as a cluster of blade servers, and the NIC 108 may operate with substantially any type of host computer 101, either alone or on a shared basis with other host computers 101. The host computer 101 may comprise a CPU 102, host memory 106, a master operating system (OS) 104, and a host interface 110. The master OS 104 may comprise one or more physical drivers 103 for controlling interaction with the NIC 108. The NIC 108 may comprise two or more ports, port 0 113 and port 1 115, a management control processor (MCP) 114 and a NIC memory 116. The NIC 108 may be coupled to the plurality of host computers 101 via a bus interface, for the Peripheral Component Interconnect-Express (PCIe) bus interface 109. The plurality of host computers 101 may be coupled to the PCIe bus interface 109 via one or more PCIe root complexes 111 and a PCIe switch 125. Alternatively, the PCIe bus interface 109 may be configured to operate at different bus speeds and to communicate with buses of other types, including parallel buses as well as packet buses.

The PCI root complexes 111 may enable the NIC 108 to be coupled to PCI buses and/or devices, the host interface 110, one or more processors, and memory, for example, host memory 106 via the PCIe switch 125. Notwithstanding, the host memory 106 may be directly coupled to the NIC 108. In this case, the host interface 110 may implement the PCI root complex functionally and may be coupled to PCI buses and/or devices, one or more processors, and memory.

One or more functions of the NIC 108 may be implemented in a single-chip device. This chip may be mounted on a separate card, or it may alternatively be mounted on the host motherboard, in LAN on motherboard (LOM) configurations, for example. Therefore, the term "NIC" as used in the description may be understood to refer to a network interface device in general, regardless of whether or not it is mounted on its own dedicated card or on a circuit board together with other components.

The MCP 114 may comprise suitable logic, circuitry, and/or code that may be enabled to synchronize one or more drivers, for example, virtual drivers 107 associated with each of the virtual NICs that share the Ethernet ports 113 and 115 associated with the physical NIC 108 based on controlling one or more parameters associated with the Ethernet ports 113 and 115. For example, the MCP 114 may be enabled to synchronize the virtual drivers 107 based on controlling the port speed, which may be operable to receive conflicting configurations from various virtual drivers 107. The MCP 114 may also be enabled to detect one or more wake on LAN (WoL) patterns associated with each of the drivers, for example, virtual drivers 107 at one or more Ethernet ports 113 and/or 115. The MCP 114 may also be enabled to communicate a wake up signal to the drivers, for example, virtual drivers 107 associated with the detected WoL patterns. The MCP 114 may also be enabled to appoint one of the drivers, for example, virtual drivers 107 to be a port master driver. If a failure of the appointed port master driver is detected, the MCP 114 may be enabled to appoint another driver, for example, one of the virtual drivers 107 to be the port master driver.

The NIC 108 may comprise one or more ports, port 0 113 and port 1 115 for receiving incoming packets from and transmitting outgoing packets to the Ethernet network 112. Although two such ports are shown in FIG. 1, in other embodiments the NIC 108 may have a single port or may have more than two ports. The NIC 108 may be enabled to perform TCP/IP and upper-layer protocol (ULP) offload processing of the incoming and outgoing packets.

The NIC 108 may utilize the PCIe bus interface 109 to read and write data to and from the host memory 106 of the host computers 101, as well as for other host communications. The NIC 108 may have an additional, dedicated NIC memory 106, such as a double data rate (DDR) synchronous dynamic random access memory (SDRAM) chip, for storing communication context and other information.

The NIC 108 may be configured to permit the resources of the NIC 108, including wire-speed protocol offload processing, to be shared among multiple host computers 101 and/or master OS 104 running on the same host computer 101. Additionally or alternatively, the processing resources of the NIC 108 may be shared among the ports 113 and 115, rather than providing a separate processing pipeline for each port. When the NIC 108 has multiple ports, each operating system may have multiple drivers, one for each port. Each driver, however, may see the NIC 108 and its resources as though they were dedicated to that specific driver. This configuration may be operable to support optimal use of the available resources, and the NIC 108 may be operable to coordinate among the potentially-conflicting instructions that it receives from different drivers.

Figure 1B:
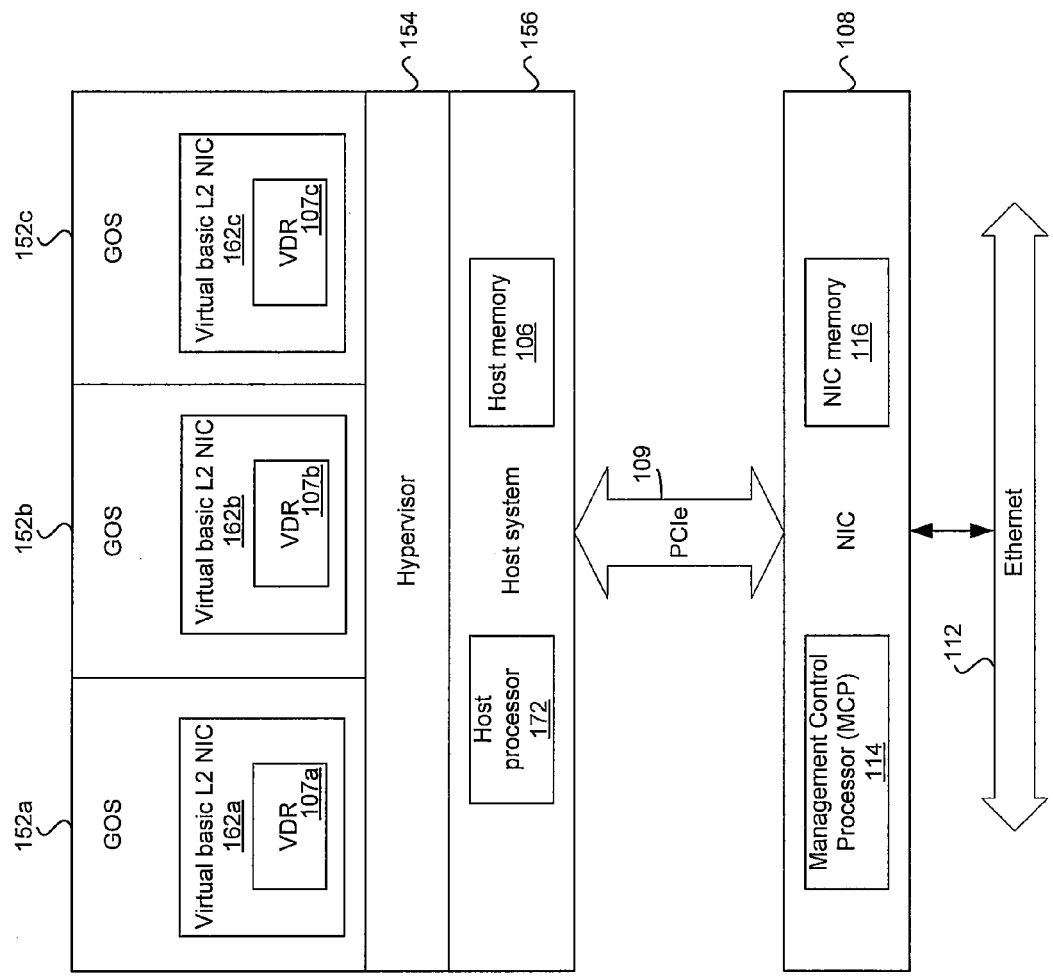
FIG. 1B is a block diagram of a NIC communicatively coupled to a host system that supports a plurality of guest operating systems (GOSs) that may be utilized in connection with an embodiment of the invention.

FIG. 1B is a block diagram of a NIC communicatively coupled to a host system that supports a plurality of guest operating systems (GOSs) that may be utilized in connection with an embodiment of the invention. Referring to FIG. 1 B, there is shown a first GOS 152*a*, a second GOS 152*b*, a third GOS 152*c*, a hypervisor 154, a host system 156, a PCIe bus 109, and a NIC 108. The NIC 108 may comprise a management control processor (MCP) 114 and a NIC memory 116 and may be coupled to a physical interface, for example, Ethernet network 112. The host system 156 may comprise a host processor 172 and a host memory 106.

The host system 156 may comprise suitable logic, circuitry, and/or code that may enable data processing and/or networking operations, for example. In some instances, the host system 156 may also comprise other hardware resources such as a graphics card and/or a peripheral sound card, for example. The host system 156 may support the operation of the first GOS 152*a*, the second GOS 152*b*, and the third GOS 152*c* via the hypervisor 154. The number of GOSs that may be supported by the host system 156 by utilizing the hypervisor 154 need not be limited to the exemplary embodiment described in FIG. 1B. For example, two or more GOSs may be supported by the host system 156.

The hypervisor 154 may operate as a software layer that may enable OS virtualization of hardware resources in the host system 156 and/or virtualization of hardware resources communicatively coupled to the host system 156, such as the NIC 108, for example. The hypervisor 154 may also enable data communication between the GOSs and hardware resources in the host system 156 and/or hardware resources communicatively connected to the host system 156. For example, the hypervisor 154 may enable packet communication between GOSs supported by the host system 156 and the NIC 108 via the PCIe bus 109.

The host processor 172 may comprise suitable logic, circuitry, and/or code that may enable control and/or management of the data processing and/or networking operations associated with the host system 156. The host memory 106 may comprise suitable logic, circuitry, and/or code that may enable storage of data utilized by the host system 156. The hypervisor 154 may be enabled to control the pages that may be accessed by each GOS. The hypervisor 154 may be enabled to support GOS creation of per-process virtual memory maps. The hypervisor 154 may enable inter-partition communication by copying data from between partitions and/or mapping certain pages for access by both a producer and a consumer partition.

The host memory 106 may be partitioned into a plurality of memory regions or portions. For example, each GOS supported by the host system 156 may have a corresponding memory portion in the host memory 106. Moreover, the hypervisor 154 may have a corresponding memory portion in the host memory 106. In this regard, the hypervisor 154 may enable data communication between GOSs by controlling the transfer of data from a portion of the memory 106 that corresponds to one GOS to another portion of the memory 106 that corresponds to another GOS.

The NIC 108 may comprise suitable logic, circuitry, and/or code that may enable communication of data with a network. The NIC 108 may enable level 2 (L2) switching operations, for example. A stateful network interface, for example, routers may be operable to maintain per flow state. The PCIe bus 109 may enable posting of data for transmission via the NIC 108 and posting of data or work requests received via the NIC 108 for processing by the host system 156. In this regard, the NIC 108 may be operable to post data or work requests received from the network in the PCIe bus 109 and may retrieve data posted by the host system 156 in the PCIe bus 109 for transmission to the network. The PCIe bus 109 may be integrated into the NIC 108, for example. The NIC memory 116 may comprise suitable logic, circuitry, and/or code that may enable storage of data utilized by the NIC 108.

The first GOS 152*a*, the second GOS 152*b*, and the third GOS 152*c* may each correspond to an operating system that may enable the running or execution of operations or services such as applications, email server operations, database server operations, and/or exchange server operations, for example. The first GOS 152*a* may comprise a virtual NIC 162*a*, the second GOS 152*b* may comprise a virtual NIC 162*b*, and the third GOS 152*c* may comprise a virtual NIC 162*c*. The virtual NIC 162*a*, the virtual NIC 162*b*, and the virtual NIC 162*c* may correspond to software representations of the NIC 108 resources, for example. In this regard, the NIC 108 resources may comprise the PCIe bus 109. Virtualization of the NIC 108 resources via the virtual NIC 162*a*, the virtual NIC 162*b*, and the virtual NIC 162*c* may enable the hypervisor 154 to provide L2 switching support provided by the NIC 108 to the first GOS 152*a*, the second GOS 152*b*, and the third GOS 152*c*.

The MCP 114 may comprise suitable logic, circuitry, and/ or code that may enable control and/or management of the data processing and/or networking operations in the NIC 108. The MCP 114 may be enabled to synchronize one or more drivers, for example, virtual drivers 107*a*, 107*b*, and/or 107*c* associated with each of the virtual NICs 162*a*, 162*b*, and/or 162*c* respectively that share the Ethernet ports 113 and 115 associated with the physical NIC 108 based on controlling one or more parameters associated with the Ethernet ports 113 and 115. For example, the MCP 114 may be enabled to synchronize one or more of the virtual drivers 107*a*, 107*b*, 107*c* based on controlling the port speed, which may receive conflicting configurations from various virtual drivers 107.

In operation, when a GOS in FIG. 1B needs to send a packet to the network, transmission of the packet may be controlled at least in part by the hypervisor 154. The hypervisor 154 may arbitrate access to the NIC 108 resources when more than one GOS needs to send a packet to the network. In this regard, the hypervisor 154 may utilize the virtual NIC to indicate to the corresponding GOS the current availability of NIC 108 transmission resources as a result of the arbitration. The hypervisor 154 may coordinate the transmission of packets from the GOSs by posting the packets in the PCIe bus 109 in accordance with the results of the arbitration operation. The arbitration and/or coordination operations that occur in the transmission of packets may result in added overhead to the hypervisor 154.

When receiving packets from the network via the NIC 108, the hypervisor 154 may determine the media access control (MAC) address associated with the packet in order to transfer the received packet to the appropriate GOS. In this regard, the hypervisor 154 may receive the packets from the PCIe bus 109 and may demultiplex the packets for transfer to the appropriate GOS. After a determination of the MAC address and appropriate GOS for a received packet, the hypervisor 154 may transfer the received packet from a buffer in the hypervisor controlled portion of the host memory 106 to a buffer in the portion of the host memory 106 that corresponds to each of the appropriate GOSs.

The virtual NICs 162a, 162b, and/or 162c may appear on an interconnect bus, for example, PCIe bus interface 109, or Hyper Transport (HT) bus as physical functions or virtual functions. The plurality of virtual drivers 107a, 107b, and/or 107c may be symmetrical, or they may be a master driver for each of the Ethernet ports 113 and/or 115.

The MCP 114 may be enabled to synchronize the plurality of virtual drivers 107a, 107b, and/or 107c sharing mutual physical resources, such as Ethernet ports 113 and/or 115, PCIe bus interface 109 and NIC-specific resources. In power management scenarios, such as power-down or reset, for example, the PCIe bus interface 109 may power-down after the last driver has unloaded.

In accordance with an embodiment of the invention, the virtual drivers, for example, 107a, 107b, and/or 107c may be synchronized based on controlling one or more parameters associated with the Ethernet ports 113 and/or 115 for one or more of the following operations: driver load, soft reset of the driver, hard reset of the driver, and/or driver unload. The MCP 114 may be enabled to implement one or more state machines to synchronize the virtual drivers 107.

Figure 1C:
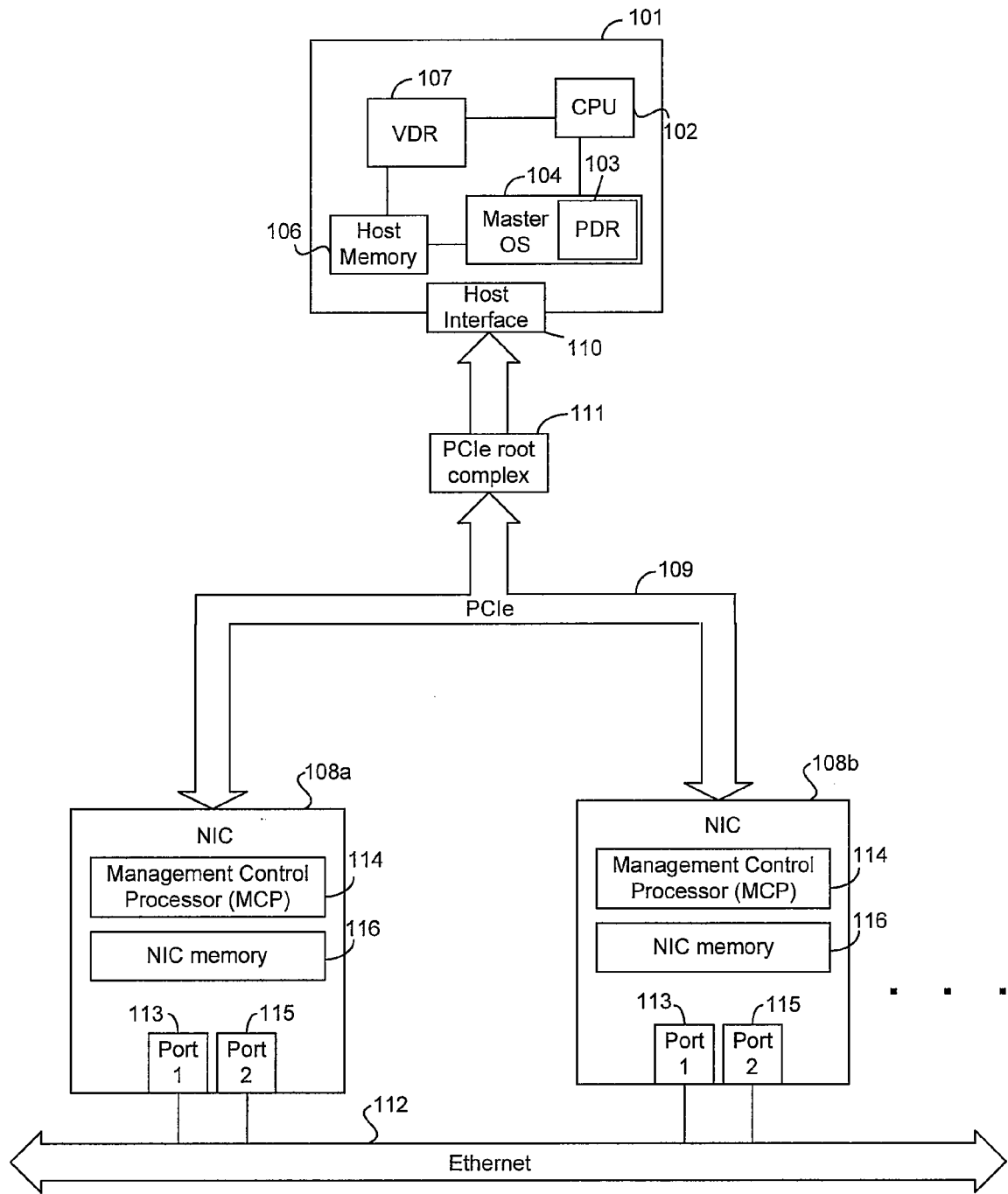
FIG. 1C is a block diagram of a plurality of NICs communicatively coupled to a host system, in accordance with an embodiment of the invention.

FIG. 1C is a block diagram of a plurality of NICs communicatively coupled to a host system, in accordance with an embodiment of the invention. Referring to FIG. 1C, there is shown a host system 101 that is connected to a physical interface, for example, Ethernet network 112 via a two or more NICs 108a, 108b, . . . ,. The Ethernet network 112 may be assumed to be a 10 Gbps Ethernet network, for example, through which various host computers may communicate with other host computers and access other computing resources. Notwithstanding, the invention may not be so limited and other network packet types and network speeds may be utilized without limiting the scope of the invention. For simplicity in the description that follows, a single one of the NICs 108a, 108b . . . may be referred to as a NIC 108. The various blocks in FIG. 1C may be substantially similar to the block described in FIG. 1A.

One or more drivers associated with each of the NICs 108a, 108b . . . that share one or more Ethernet ports 113 and/or 115 associated with the NICs 108a, 108b . . . may be synchronized based on controlling one or more parameters associated with one or more Ethernet ports 113 and/or 115. In accordance with an embodiment of the invention, a method and system for configuring a plurality of network interfaces, for example, host interfaces 101a, 101b, . . . and/or NICs 108a, 108b, . . . that share a physical interface (PHY), for example, the Ethernet network 112 may be disclosed.

Figure 2:
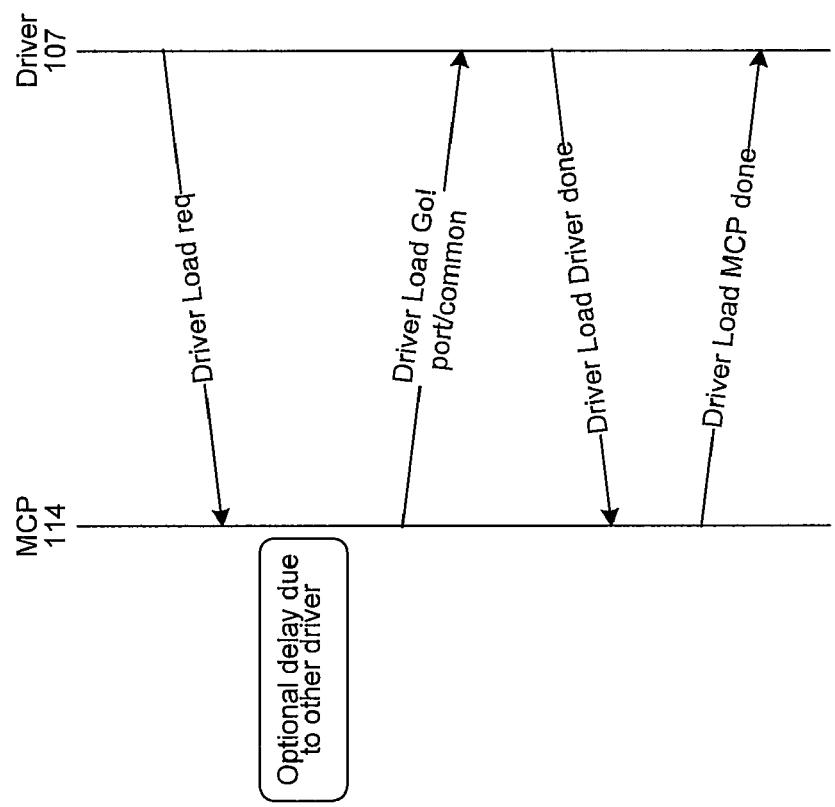
FIG. 2 is a diagram illustrating exemplary 4-way handshake for a driver load request, in accordance with an embodiment of the invention.

FIG. 2 is a diagram illustrating exemplary 4-way handshake for a driver load request, in accordance with an embodiment of the invention. Referring to FIG. 2, there is shown a MCP 114 and a driver 107.

The MCP 114 may be enabled to receive one or more host system interface (HSI) commands from the driver 107. The driver 107 may be operable to initiate a HSI command, for example, a driver load request. The MCP 114 may be enabled to delay processing of the received HSI command if any other driver is processing another HSI command. The MCP 114 may be enabled to authorize the driver 107 to process the received HSI command, for example, driver load request when no other HSI commands are being processed, for example, by communicating a GO command.

The MCP 114 may be enabled to receive a driver completion notification, for example, a DriverDone message from the driver 107 when the driver 107 completes processing of the received HSI command, for example, driver load request. The MCP 114 may be enabled to communicate a processor completion notification, for example, MCPDone message to the driver 107 based on the received driver completion notification, for example, DriverDone message from the driver 107. The MCP 114 may be enabled to authorize the driver 107 to process another received HSI command after communication of the processor completion notification, for example, MCPDone message to the driver 107.

Figure 3:
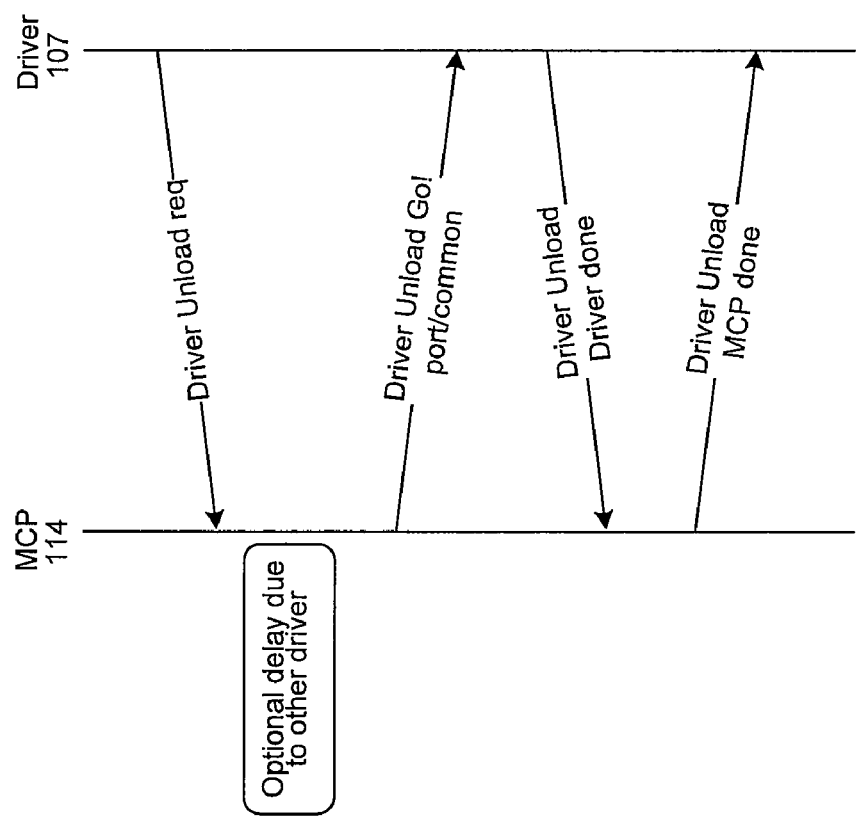
FIG. 3 is a diagram illustrating exemplary 4-way handshake for a driver unload request, in accordance with an embodiment of the invention.

FIG. 3 is a diagram illustrating exemplary 4-way handshake for a driver unload request, in accordance with an embodiment of the invention. Referring to FIG. 3, there is shown a MCP 114 and a driver 107.

The driver 107 may initiate a HSI command, for example, a driver unload request. The MCP 114 may be enabled to delay processing of the received driver unload request if any other driver is processing another HSI command. The MCP 114 may be enabled to authorize the driver 107 to process the received driver unload request when no other HSI commands are being processed, for example, by communicating a GO command.

The MCP 114 may be enabled to receive a driver completion notification, for example, a DriverDone message from the driver 107 when the driver 107 completes processing of the received driver unload request. The MCP 114 may be enabled to communicate a processor completion notification, for example, MCPDone message to the driver 107 based on the received driver completion notification, for example, DriverDone message from the driver 107. The MCP 114 may be enabled to authorize the driver 107 to process another received HSI command after communication of the processor completion notification, for example, MCPDone message to the driver 107.

Figure 4:
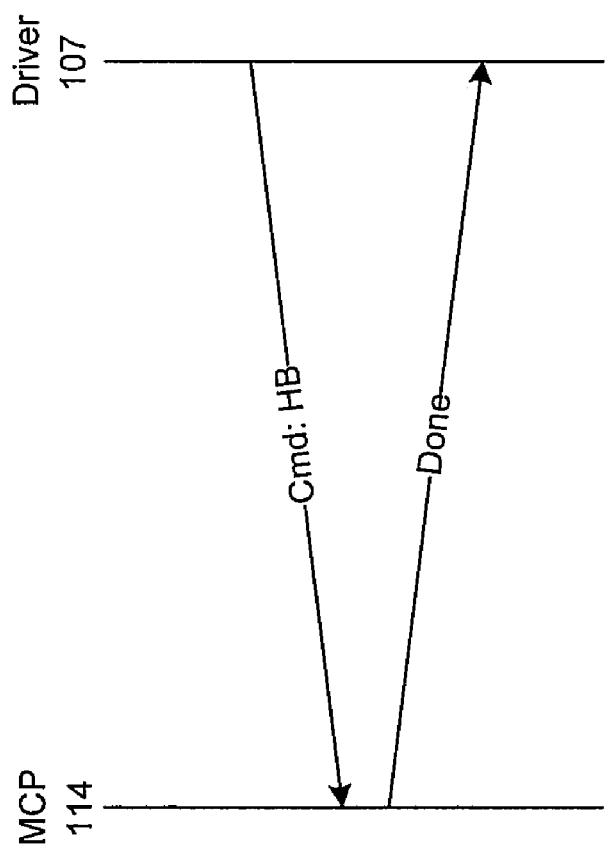
FIG. 4 is a diagram illustrating exemplary heartbeat handshake between a driver and a management processor, in accordance with an embodiment of the invention.

FIG. 4 is a diagram illustrating exemplary heartbeat handshake between a driver and a management processor, in accordance with an embodiment of the invention. Referring to FIG. 4, there is shown a MCP 114 and a driver 107.

The driver 107 may initiate a HSI command, for example, a driver heart-beat request. The MCP 114 may be enabled to communicate a processor completion notification, for example, Done message to the driver 107 after completing processing of the driver heart-beat request. The MCP 114 may be enabled to authorize the driver 107 to process another received HSI command after communication of the processor completion notification, for example, Done message to the driver 107.

Figure 5:
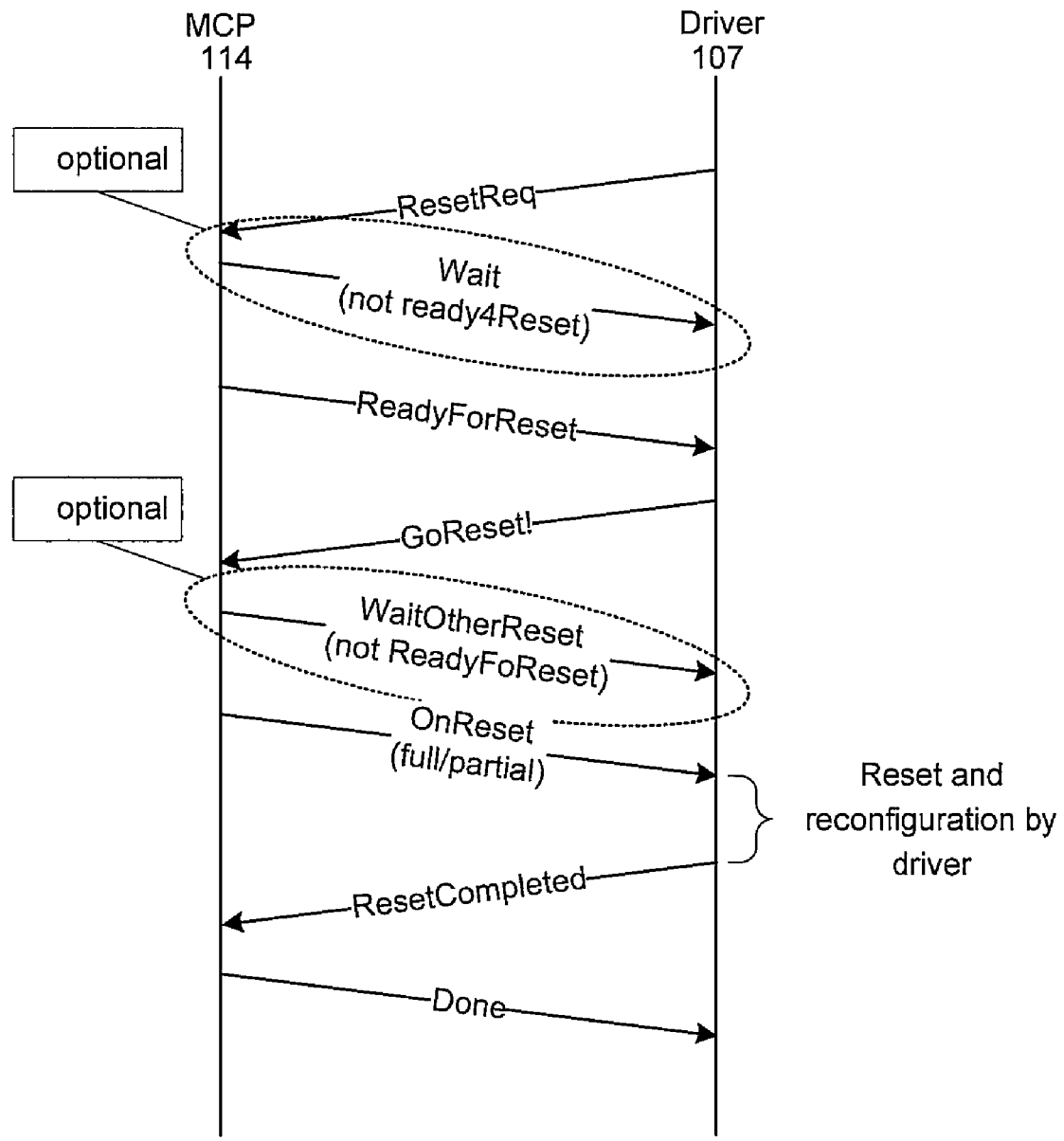
FIG. 5 is a diagram illustrating exemplary reset handshake between a driver and a management processor, in accordance with an embodiment of the invention.

FIG. 5 is a diagram illustrating exemplary reset handshake between a driver and a management processor, in accordance with an embodiment of the invention. Referring to FIG. 5, there is shown a MCP 114 and a driver 107.

The driver 107 may initiate a HSI command, for example, a driver reset request. The MCP 114 may be enabled to delay processing of the received driver reset request if any other driver is processing another HSI command by communicating a Wait message, for example. The MCP 114 may be enabled to authorize the driver 107 to process the received driver reset request when no other HSI commands are being processed, for example, by communicating a ReadyForReset command.

The MCP 114 may be enabled to receive a GoReset command from the driver 107. The MCP 114 may be enabled to delay processing of the received driver reset request by communicating a Wait message, for example. The MCP 114 may be enabled to communicate an OnReset command, for example, to authorize the driver 107 to reset and reconfigure.

The MCP 114 may be enabled to receive a driver completion notification, for example, a ResetCompleted message from the driver 107 when the driver 107 completes processing of the received driver reset request. The MCP 114 may be enabled to communicate a processor completion notification, for example, Done message to the driver 107 based on the received driver completion notification, for example, ResetCompleted message from the driver 107. The MCP 114 may be enabled to authorize the driver 107 to process another received HSI command after communication of the processor completion notification, for example, Done message to the driver 107. Notwithstanding, a 6-way handshake may be utilized for a driver reset request HSI, for example, without limiting the scope of the invention.

In accordance with an embodiment of the invention, the GO command authorization may comprise one or more flavors, for example, to enable the NIC 108 to synchronize the driver 107 with the NIC 108 state. For example, common resource initialization may occur for first function driver load while relevant port initialization may occur for a second function driver load. After driver load request flow is completed, other HSI commands, for example, offload initiation, or doorbells may be initiated.

In accordance with an embodiment of the invention, a driver disable request HSI command may have one or more flavors, for example, to enable the driver 107 to notify the NIC 108 for WoL request mode. One of the drivers may enter a diagnostics mode, for example. In order to enter diagnostics mode, both drivers may be in the "driver down" state. When one of the drivers is in the diagnostic mode, any driver load request may be replied with a HSI Enable Refuse command, for example. A driver load request may comprise date information for licensing, for example.

In accordance with an exemplary embodiment of the invention, to enable the synchronization of the virtual drivers 107a, 107b, and/or 107c that share the same Ethernet port 113 and/or 115, a GO common command, a GO port command and a GO PCIe command may be implemented. The authorization of the driver 107 may comprise one or more of a common authorization, an Ethernet port authorization, and/or a PCIe root complex authorization.

The GO common command or the common authorization of the driver 107 may comprise authorizing the driver 107 to initialize the common resources of the physical NIC 108, the resources of the Ethernet ports 113 and/or 115, and/or the PCIe root complex 111. The Go port command may be authorized when the GO common command was already initialized by another driver or another driver is in the "driver is up" state and the Ethernet port 113 and/or 115 was not initialized or for the same Ethernet port 113 and/or 115, no driver is in the "driver is up" state. The Go port command or the Ethernet port authorization may comprise authorizing the driver 107 to initialize the resources of the Ethernet ports 113 and/or 115 and/or a PCIe root complex 111.

The GO PCIe command may be authorized when the GO common command was already initialized by another driver or another driver is in the "driver is up" state and the Ethernet port 113 and/or 115 was not initialized or for the same Ethernet port 113 and/or 115, no driver is in the "driver is up" state. The GO PCIe command or the PCIe root complex authorization may comprise authorizing the driver 107 to initialize the PCIe root complex 111.

In accordance with an embodiment of the invention, the MCP 114 may enable the driver 107 to configure, update or initialize per-port parameters, tables, memories that may be required once per Ethernet port 113 and/or 115. For example, the MCP 114 may be enabled to resolve conflicting MAC configurations such as link speed. The MCP 114 may be enabled to synchronize a plurality update commands of the plurality of drivers 107 and/or functions. One or more HSI commands between the drivers 107 and the MCP 114 may be utilized to support these settings. The HSI commands may be authorized when the driver 107 that initiates them is in the "driver is up" state.

Figure 6:
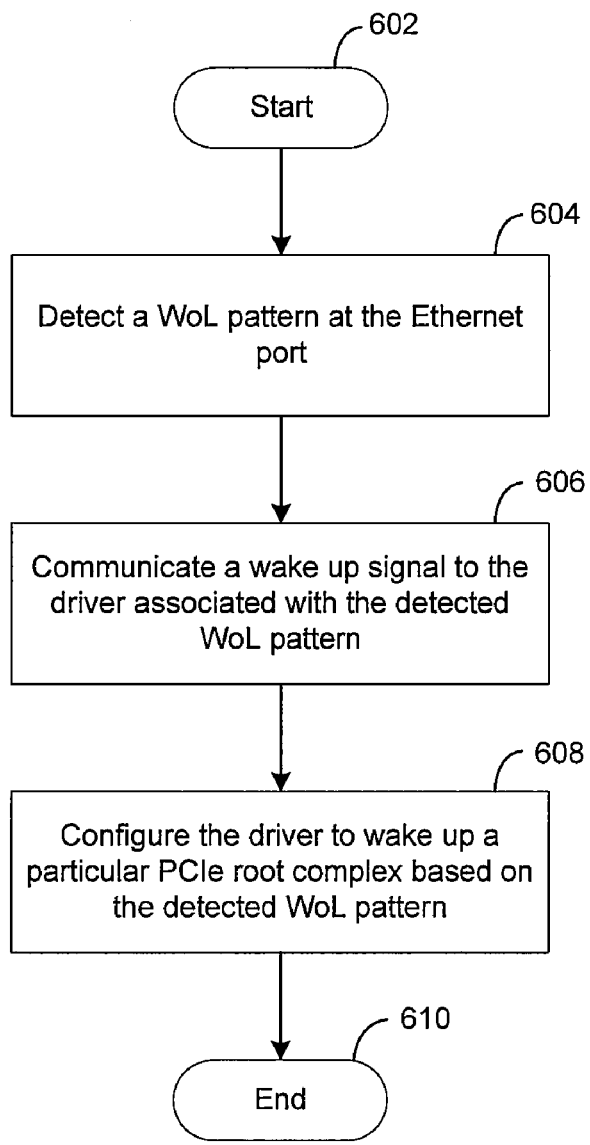
FIG. 6 is a flowchart illustrating exemplary steps for waking up drivers based on detected wake on LAN (WoL) patterns in a system for configuring a plurality of network interfaces that share a physical interface (PHY), in accordance with an embodiment of the invention.

FIG. 6 is a flowchart illustrating exemplary steps for waking up drivers based on detected wake on LAN (WoL) patterns in a system for configuring a plurality of network interfaces that share a physical interface (PHY), in accordance with an embodiment of the invention. Referring to FIG. 6, exemplary steps begin at start step 602. In step 604, the MCP 114 may be enabled to detect one or more wake on LAN (WoL) patterns associated with each of the drivers, for example, virtual drivers 107a, 107b, and/or 107c at one or more Ethernet ports 113 and/or 115. In step 606, the MCP 114 may be enabled to communicate a wake up signal to the drivers, for example, virtual drivers 107a, 107b, and/or 107c associated with the detected one or more WoL patterns. In step 608, the MCP 114 may be enabled to configure each of the drivers, for example, virtual drivers 107a, 107b, and/or 107c to wake up a particular PCIe root complex 111 based on the detected one or more WoL patterns. Control then passes to end step 610.

Each driver 107 may configure a different WoL pattern that may be intended to wake a particular driver. When the drivers 107 reside on the same host computer 101, either of the WoL patterns may wake the host computer 101. For multiple servers, for example, blade systems, each driver 107 may reside on a different server, and each WoL pattern may wake up a different driver 107, and a different server. Each WoL pattern may correspond to a specific driver, or to a group of drivers. When a driver 107 loads, the driver 107 may be enabled to configure its WoL patterns. The driver 107 may unload and the server may power down. When a WoL pattern appears on the Ethernet ingress port 113 and/or 115, the driver 107 may request to be woken on a specific server, in which case, if that server is powered-down at that time, it may be powered-up by the NIC 108 when the corresponding WoL pattern appears.

In accordance with an embodiment of the invention, the MCP 114 may comprise a hardware multi-pattern detector, which may be enabled to concurrently detect multiple WoL patterns. Each of the drivers 107 may be operable to configure its own WoL patterns. Additionally, each driver, before it unloads, may configure which PCIe root-complex 111 or PCIe root-complexes to wake in case of a detected WoL pattern. Each driver 107 may configure a single WoL pattern to wake up one or more servers and/or host computers. When a particular WoL pattern is detected at the Ethernet ports 113 and/or 115, the MCP 114 may communicate a wake up signal or a PCIe beacon signal, or any other similar mechanism in other interconnect interfaces to the appropriate PCIe root complex 111 according to the configuration of the driver 107.

Figure 7:
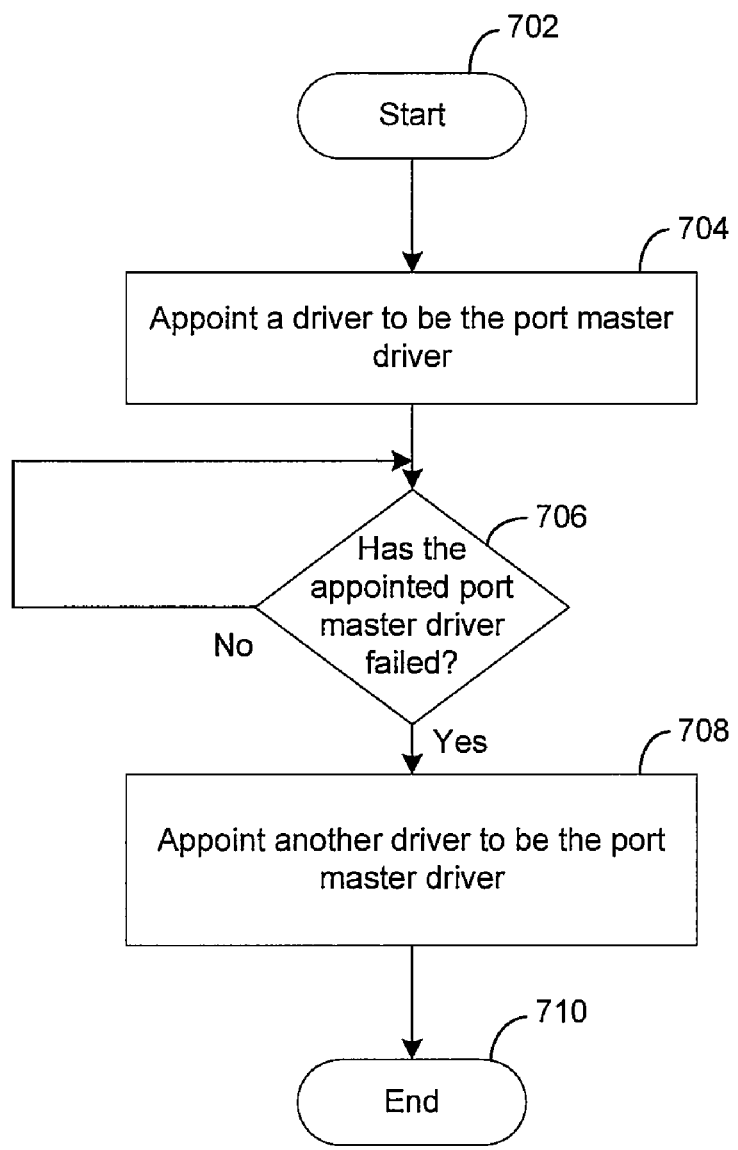
FIG. 7 is a flowchart illustrating exemplary steps for appointing a port master driver in a system for configuring a plurality of network interfaces that share a physical interface (PHY), in accordance with an embodiment of the invention.

FIG. 7 is a flowchart illustrating exemplary steps for appointing a port master driver in a system for configuring a plurality of network interfaces that share a physical interface (PHY), in accordance with an embodiment of the invention. Referring to FIG. 7, exemplary steps begin at start step 702. In step 704, the MCP 114 may be enabled to appoint one of the one or more drivers, for example, virtual drivers 107a, 107b, and/or 107c to be a port master driver. In step 704, the MCP 114 may be enabled to determine whether the appointed port master driver has failed. The MCP 114 may be enabled to detect failure of the appointed port master driver based on one or more of an expiry of a master driver timer, an unload notification by the appointed master driver and/or a failure of an acknowledgement by the appointed port master driver. In instances where the appointed port master driver has not failed control returns to step 704. In instances where the appointed port master driver has failed, control passes to step 706. In step 706, the MCP 114 may be enabled to appoint one other driver, for example, one of the virtual drivers 107*a*, 107*b*, and/or 107*c* as the port master driver based on the detection of the failure of the appointed port master driver. Control then passes to end step 708.

The port master driver may be enabled to control the Ethernet port parameters. The port master driver may be enabled to hold per-port global data that may be shared among other drivers 107 sharing a particular Ethernet port 113 and/or 115, and other functionalities as required by a NIC vendor. A distributed synchronization algorithm may be utilized for choosing the port master driver, for example, to hold global data structures or global meta-data that may be shared among the drivers 107 sharing an Ethernet port 113 and/or 117. The port master driver may be enabled to handle attentions, events, and hardware errors that may be detected by the NIC 108 that are physical port-specific.

The MCP 114 may be enabled to implement a doorbell mechanism for each driver 107 to notify the MCP 114 which messages or tasks to handle. The MCP 114 may be enabled to notify each driver 107, by way of attention, that an event has occurred, and that it may be appointed as the new port master driver.

When the first driver loads for a specific Ethernet port 113 and/or 115, the MCP 114 may appoint the first driver to be the port master driver for this Ethernet port 113 and/or 115. The MCP 114 may appoint another driver as the port master driver based on detection of a driver unload request, server power-down, or server reset, for example. The port master driver may initialize its per-port structures in the NIC 108 and per function structures. In instances where the port master driver is the first driver to load globally over the entire set of ports, then the port master driver may also perform a port common initialization. The next driver that attempts to share the same Ethernet port 113 and/or 115 may be indicated by the MCP 114 that it is not the first driver to use this Ethernet port, and may not be the port master driver. The port master driver may be aware of its master traits by receiving this information from the MCP 114 during driver load.

Various embodiments of the invention may be enabled to detect a failure in a port master driver. Failover or switching the port master driver to another driver may occur, and the port master driver may or may not currently be on the same blade server. Global data may be copied among drivers so as to facilitate the failover or switching. The MCP 114 may be enabled to detect failure of a port master driver by utilizing, for example, a watchdog timer, where the port master driver may continuously, for example, every 1 ms reset a per-port MCP 114 watchdog timer. When the MCP 114 watchdog timer expires, the MCP 114 may appoint another driver as the port master driver. The port master driver itself may notify the MCP 114 that it is about to unload. The MCP 114 may communicate an indication to the port master driver, for example, every 1 ms and if the port master driver does not acknowledge this attention, then the port master driver may be considered to have failed. The MCP 114 may perform a zero length read from host memory 106 periodically to verify that the host computer 101 is still active. The fail over operation may be performed within a certain time period in order to avoid resetting the NIC TCP connections.

The MCP 114 may be enabled to detect that a fail over of the port master driver may occur. The MCP 114 may quiesce the Ethernet port 113 and/or 115 so that the port master driver data structure may not be changed by the NIC 108 during the fail over operation. The MCP 114 may notify another driver by means of an attention interrupt to be appointed as the port master driver on this Ethernet port 113 and/or 115. The other driver may allocate memory space to hold port master driver data structure or alternatively, all drivers may allocate memory space when they load, regardless of whether they are masters or not. The other driver may ensure that all the NIC DMA requests that may change the port master driver data structure have been committed by another handshake between a current port master driver and a new port master driver via the MCP 114, for example. The other driver may start performing a DMA operation on the data structures of the port master driver to its own memory space. The other driver may notify the MCP 114 that it is ready to become a master. The MCP 114 may appoint the other driver to be the new port master driver. The MCP 114 may notify the old port master driver to unload, if it is not unloaded already. In one embodiment of the invention, the old port master driver and the new port master driver may be resident in different servers.

In instances where the fail over operation is performed between drivers that reside on different servers, data copying may be performed. Otherwise, n instances where the drivers reside on the same server, the driver may unload without freeing the global data structure and communicate the pointers to these data structures through the MCP 114 to the new port master driver. The new port master driver may free the global data structure or pass the global data structure on to the next port master driver. In instances where data copying may be performed between the old and the new port master driver, then the new port master driver may perform the copying through a DMA engine inside the NIC 108. The new port master driver may program the DMA engine to copy blocks of memory of the global data structures from one driver to another. The DMA engine inside the NIC 108 may notify the new port master driver that it has completed the copying and the new data structures may be handled by the new port master driver.

In accordance with an embodiment of the invention, the MCP 114 may be enabled to control network traffic between one or more physical NICs, for example, NIC 108 based on monitoring of the common resources of the one or more physical NICs, for example, NIC 108. The MCP 114 may be enabled to collect statistics and load-balance the network traffic based either on volume or available resources by moving the handling of NICs 108, and their applications from host computer 101*a* to host computer 101*b*, for example.

The MCP 114 may be enabled to communicate an interrupt to a special driver on an intended host computer 101*b* to initiate the network traffic handoff to move a NIC 108 and its application. In another embodiment, a hot-plug PCI event may be simulated to the hot plugging of the PCI function into the new host computer, and unplugging the PCI function from the old host computer 101*a*. The MCP 114 may be enabled to communicate an unplug event to the old host computer 101*a*, which may cause the driver 107 on the host computer to remove the device.

In accordance with an embodiment of the invention, a method and system for configuring a plurality of network interfaces that share a physical interface (PHY) may comprise one or more physical network interface controllers (NICs), for example, NIC 108 and two or more virtual NICs, for example, 162*a*, 162*b* and 162*c*. The MCP 114 may be enabled to synchronize one or more, for example, virtual drivers 107a, 107b, and/or 107c associated with each of the two or more virtual NICs 162a, 162b and 162c that share one or more Ethernet ports 113 and/or 115 associated with one or more physical NICs, for example, NIC 108 based on controlling one or more parameters, for example, port speed associated with the one or more Ethernet ports, 113 and/or 115.

The MCP 114 may be enabled to receive one or more host system interface (HSI) commands from the one or more drivers, for example, virtual drivers 107a, 107b, and/or 107c. The one or more HSI commands may comprise one or more of a driver load request, a driver unload request, a driver reset request, a driver heart-beat request and/or a driver diagnostic mode request. The MCP 114 may be enabled to authorize the one or more drivers, for example, virtual drivers 107a, 107b, and/or 107c to process the received one or more HSI commands when no other HSI commands are being processed, for example, by communicating a GO command. The authorization of the one or more drivers, for example, virtual drivers 107a, 107b, and/or 107c may comprise one or more of a common authorization, an Ethernet port authorization, and/or a PCIe root complex authorization.

The common authorization of the one or more drivers, for example, virtual drivers 107a, 107b, and/or 107c may comprise authorizing the one or more drivers, for example, virtual drivers 107a, 107b, and/or 107c to initialize one or more of common resources of the one or more physical NICs, for example, NIC 108, resources of the one or more Ethernet ports 113, 115, and/or the PCIe root complex 111. The Ethernet port authorization may comprise authorizing the one or more drivers, for example, virtual drivers 107a, 107b, and/or 107c to initialize the resources of the one or more Ethernet ports 113, 115 and/or a PCIe root complex 111. The PCIe root complex authorization may comprise authorizing the one or more drivers, for example, virtual drivers 107a, 107b, and/or 107c to initialize the PCIe root complex 111. The MCP 114 may be enabled to control network traffic between one or more physical NICs, for example, NIC 108 based on monitoring of the common resources of the one or more physical NICs, for example, NIC 108.

The MCP 114 may be enabled to receive a driver completion notification, for example, a DriverDone message from the one or more drivers, for example, virtual drivers 107a, 107b, and/or 107c when the one or more drivers, for example, virtual drivers 107a, 107b, and/or 107c completes processing of the received one or more HSI commands. The MCP 114 may be enabled to communicate a processor completion notification, for example, MCPDone message to the one or more drivers, for example, virtual drivers 107a, 107b, and/or 107c based on the received driver completion notification, for example, DriverDone message from one or more drivers, for example, virtual drivers 107a, 107b, and/or 107c. The MCP 114 may be enabled to authorize one or more other drivers, for example, virtual drivers 107a, 107b, and/or 107c to process the received one or more HSI commands after communication of the processor completion notification, for example, MCPDone message to one or more drivers, for example, virtual drivers 107a, 107b, and/or 107c.

The MCP 114 may be enabled to detect one or more wake on LAN (WoL) patterns associated with each of the one or more drivers, for example, virtual drivers 107a, 107b, and/or 107c at one or more Ethernet ports 113 and/or 115. The MCP 114 may be enabled to communicate a wake up signal to one or more drivers, for example, virtual drivers 107a, 107b, and/or 107c associated with the detected one or more WoL patterns. The MCP 114 may be enabled to configure each of the one or more drivers, for example, virtual drivers 107a, 107b, and/or 107c to wake up a particular PCIe root complex 111 based on the detected one or more WoL patterns.

The MCP 114 may be enabled to appoint one of the one or more drivers, for example, virtual drivers 107a, 107b, and/or 107c to be a port master driver. The MCP 114 may be enabled to detect failure of the appointed port master driver based on one or more of an expiry of a master driver timer, an unload notification by the appointed master driver and/or a failure of an acknowledgement by the appointed port master driver. The MCP 114 may be enabled to appoint one other driver, for example, one of the virtual drivers 107a, 107b, and/or 107c as the port master driver based on the detection of the failure of the appointed port master driver.

Another embodiment of the invention may provide a machine-readable storage, having stored thereon, a computer program having at least one code section executable by a machine, thereby causing the machine to perform the steps as described herein for sharing a plurality of NICs via an Ethernet network. Various embodiments of the invention may provide one or more circuits that may be operable to enable performing the steps as described herein for sharing a plurality of NICs via an Ethernet network.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data, the method comprising:
    synchronizing by a physical network interface controller (NIC), one or more virtual drivers associated with each of a plurality of virtual NICs, based on controlling one or more parameters associated with one or more Ethernet ports, wherein each of said plurality of virtual NICs share said one or more Ethernet ports associated with said physical NIC.

2. The method according to claim 1, comprising receiving one or more host system interface (HSI) commands from said one or more virtual drivers.

3. The method according to claim 2, wherein said one or more HSI commands comprises one or more of: a driver load request, a driver unload request, a driver reset request, a driver heart-beat request and/or a driver diagnostic mode request.

4. The method according to claim 3, comprising authorizing said one or more virtual drivers to process said received one or more HSI commands when no other said one or more HSI commands are being processed.

5. The method according to claim 4, wherein said authorizing of said one or more virtual drivers comprises one or more of: a common authorization, an Ethernet port authorization, and/or a Peripheral Component Interconnect-Express (PCIe) root complex authorization.

6. The method according to claim 5, wherein said common authorization comprises authorizing one or more of: common resources of one or more of said physical NICs, resources of said one or more Ethernet ports, and/or said PCIe root complex.

7. The method according to claim 6, comprising controlling network traffic between said one or more physical NICs based on monitoring of said common resources of said one or more physical NICs.

8. The method according to claim 4, comprising receiving a driver completion notification from said one or more virtual drivers when said one or more virtual drivers completes processing of said received one or more HSI commands.

9. The method according to claim 8, comprising communicating a processor completion notification to said one or more virtual drivers based on said received driver completion notification from said one or more virtual drivers.

10. The method according to claim 9, comprising authorizing one or more other virtual drivers to process said received one or more HSI commands after said communicating of said processor completion notification to said one or more virtual drivers.

11. The method according to claim 1, comprising:
detecting one or more wake on LAN (WoL) patterns associated with each of said one or more virtual drivers at said one or more Ethernet ports; and
communicating a signal to said one or more virtual drivers associated with said detected one or more WoL patterns.

12. The method according to claim 11, comprising configuring each of said one or more virtual drivers to wake up a particular Peripheral Component Interconnect-Express (PCIe) root complex based on said detected one or more WoL patterns.

13. The method according to claim 1, comprising appointing one of said one or more virtual drivers to be a port master driver.

14. The method according to claim 13, comprising detecting failure of said appointed port master driver based on one or more of: an expiry of a master driver timer, an unload notification by said appointed port master driver and/or a failure of an acknowledgement by said appointed port master driver.

15. The method according to claim 14, comprising appointing one other virtual driver as said port master driver based on said detection of said failure of said appointed port master driver.

16. A system for processing data, the system comprising:
one or more processors and/or circuits for use in a physical network interface controller (NIC), said one or more processors and/or circuits being operable to synchronize one or more virtual drivers associated with each of a plurality of virtual NICs, based on controlling one or more parameters associated with one or more Ethernet ports, wherein each of said plurality of virtual NICs share said one or more Ethernet ports associated with said physical NIC.

17. The system according to claim 16, wherein said one or more processors and/or circuits are operable to receive one or more host system interface (HSI) commands from said one or more virtual drivers.

18. The system according to claim 17, wherein said one or more HSI commands comprises one or more of: a driver load request, a driver unload request, a driver reset request, a driver heart-beat request and/or a driver diagnostic mode request.

19. The system according to claim 18, wherein said one or more processors and/or circuits are operable to authorize said one or more virtual drivers to process said received one or more HSI commands when no other said one or more HSI commands are being processed.

20. The system according to claim 19, wherein said authorizing of said one or more virtual drivers comprises one or more of: a common authorization, an Ethernet port authorization, and/or a Peripheral Component Interconnect-Express (PCIe) root complex authorization.

21. The system according to claim 20, wherein said common authorization comprises authorizing one or more of: common resources of one or more of said physical NICs, resources of said one or more Ethernet ports, and/or said PCIe root complex.

22. The system according to claim 21, wherein said one or more processors and/or circuits are operable to control network traffic between said one or more physical NICs based on monitoring of said common resources of said one or more physical NICs.

23. The system according to claim 19, wherein said one or more processors and/or circuits are operable to receive a driver completion notification from said one or more virtual drivers when said one or more virtual drivers completes processing of said received one or more HSI commands.

24. The system according to claim 23, wherein said one or more processors and/or circuits are operable to communicate a processor completion notification to said one or more virtual drivers based on said received driver completion notification from said one or more virtual drivers.

25. The system according to claim 24, wherein said one or more processors and/or circuits are operable to authorize one or more other virtual drivers to process said received one or more HSI commands after said communicating of said processor completion notification to said one or more virtual drivers.

26. The system according to claim 16, wherein said one or more processors and/or circuits are operable to:
one or more wake on LAN (WoL) patterns associated with each of said one or more virtual drivers at said one or more Ethernet ports; and
communicate a signal to said one or more virtual drivers associated with said detected one or more WoL patterns.

27. The system according to claim 26, wherein said one or more processors and/or circuits are operable to configure each of said one or more virtual drivers to wake up a particular Peripheral Component Interconnect-Express (PCIe) root complex based on said detected one or more WoL patterns.

28. The system according to claim 16, wherein said one or more processors and/or circuits are operable to appoint one of said one or more virtual drivers to be a port master driver.

29. The system according to claim 28, wherein said one or more processors and/or circuits are operable to detect a failure of said appointed port master driver based on one or more of:

an expiry of a master driver timer, an unload notification by said appointed port master driver and/or a failure of an acknowledgement by said appointed port master driver.

30. The system according to claim 29, wherein said one or more processors and/or circuits are operable to appoint one other virtual driver as said port master driver based on said detection of said failure of said appointed port master driver.

\* \* \* \* \*